United States Patent [19]

Yamamoto et al.

[11] 3,904,780

[45] Sept. 9, 1975

[54] METHOD FOR GIVING AND INCREASING THE FLAVOR RESEMBLING TO DAIRY PRODUCT

[75] Inventors: Ryo Yamamoto; Izuru Yamamoto, both of Tokyo; Takumi Yoshizawa, Hara-Mura, all of Japan

[73] Assignees: Suntory Ltd.; Shiono Koryo Kaisha Ltd., both of Osaka, Japan

[22] Filed: May 30, 1973

[21] Appl. No.: 365,134

[52] U.S. Cl. ............................................. 426/534
[51] Int. Cl.² ...................................... A23L 1/226
[58] Field of Search ............ 426/65, 175, 221, 200, 426/185, 188, 189, 356; 260/597 R, 585.5; 424/331

[56] References Cited

UNITED STATES PATENTS

| | | | |
|---|---|---|---|
| 3,034,902 | 5/1962 | Bavisotto | 426/221 X |
| 3,655,397 | 4/1972 | Parliment et al. | 426/175 |

OTHER PUBLICATIONS

Chem. Abstracts, 74:2812t, (1971).

*Primary Examiner*—A. Louis Monacell
*Assistant Examiner*—Esther L. Massung
*Attorney, Agent, or Firm*—Flynn & Frishauf

[57] ABSTRACT

Method for imparting a dairy product flavor to a food stuff said flavor resembles to that of dairy product which characterizes in addition of 8-nonene-2-one and compounded flavor materials.

14 Claims, No Drawings

METHOD FOR GIVING AND INCREASING THE FLAVOR RESEMBLING TO DAIRY PRODUCT

This invention relates to a method for giving foodstuffs a flavor resembling that of a dairy product or products or increasing a flavor of foodstuffs resembling that of a dairy product or products. More particularly it relates to a method for giving foodstuffs a flavor or increasing a flavor of foodstuffs in which said flavor resembles that of a dairy product or products, and said foodstuffs, being the primary dairy products such as cheese, butter, cream, condensed milk or the secondary dairy products such as drinks, cookies and cakes made from the primary dairy products, which comprises incorporating therein 8-nonene-2-one.

As flavor materials, it is already known that the following materials are contained in natural cheese, natural butter, natural cream and the like. They are:

1. Saturated or unsaturated straight chain fatty acids having an even number of carbon atoms of 4–18 such as butyric acid, caproic acid, caprylic acid, capric acid, lauric acid, myristic acid, palmitic acid, stearic acid, oleic acid, etc. and lower alkyl esters of said fatty acids such as methyl esters or ethyl esters. '2. Saturated straight chain methyl ketones having 3–15 carbon atoms, such as acetone, butanone, 2-pentanone, 2-hexanone, 2-heptanone, etc.

3. Saturated or unsaturated straight and branched aldehydes having 1–14 carbon atoms, diketone, ketoalcohol such as heptanal, nonene-2-al, diacetyl, acetoin.

4. Secondary saturated aliphatic alcohols having 3–9 carbon atoms, such as 2-pentanol, 2-heptanol, 2-nonanol.

5. delta-Lactone of aliphatic compounds having 8–16 carbon atoms, such as delta-decalactone, delta-dodecalactone.

6. Small quantity of amines, sulfur containing compounds, such as methyl amine, dimethyl sulfide, methyl mercaptan.

Various compounds shown hereinabove have been prepared and added to natural and artificial foodstuffs to give them flavors and to increase their flavors resembling those of dairy products. Of these compounds, saturated methyl ketones shown in No. (2) are known to be important materials for this effect. It has been a common practice to add various compounds shown above to natural and artificial foodstuffs to give them flavors and to increase their flavors resembling those of dairy products. It has also been a common practice to add the following materials to such foodstuffs of less flavor as cheese, butter and artificial butter in order to give them flavors and to increase their flavors resembling those of dairy products. The materials are:

| | |
|---|---|
| saturated fatty acids having carbon atoms of 4–12 | 3–30 parts |
| lower alkyl esters of saturated fatty acid having carbon atoms of 4–12 | 0.1–1 " |
| saturated methyl ketones having carbon atoms of 4–12 | 10–30 " |
| secondary alcohols of fatty acid having carbon atoms of 3–9 | 0.1–1 " |
| diacetyl and/or acetoin | 0.1–1 " |
| delta-lactones having carbon atoms of 4–10 | 1–30 " |
| triglyceride of fatty acids having carbon atoms of 8–10 or natural vegetable oil | 900–1000 " |

Examples of foods containing the above-mentioned compounds are known publicly. Triglycerides of fatty acids having 8–10 carbon atoms have been added to flavor materials or natural vegetable oils as solvents therefor. Despite the addition of such synthetic flavor materials, it has been very difficult to impart to food products the natural flavor of fresh cheese, butter or cream. Various studies have been made to find a simple material having a cheese-like and/or butter-like flavor on the assumption that such a single material may exist, but no satisfactory result has been obtained.

Many natural flavor materials have in their chemical structures cis-type double bonds and the applicants have synthesized various compounds which may be suitable for cheese, butter and/or cream to increase flavor of any one or more of these products. It has been found that, among straight chain compounds, an unsaturated methyl ketone rather than an alcohol has a strong cheese-like flavor and that such compound having nine carbon atoms and having the double bond positioned as far from the carbonyl radical as possible, especially that is positioned at its end, has a flavor having a strong resemblance to that of cheese. Based on such findings, the applicants have at last discovered that 8-nonene-2-one alone gives particularly strong flavor resembling that of fresh Blue cheese and to those common to fresh dairy products.

This invention is concerned with a method for imparting to a foodstuff a dairy product flavor by incorporating with the foodstuff 8-nonene-2-one or a compounded flavor material containing said 8-nonene-2-one.

8-nonene-2-one is a material already known and J. M. Conia et al., for instance, synthesized this by the Grignard reaction, i.e., 1,4-addition reaction of 5-bromo-1-pentene to methyl vinyl ketone [Tetrahedron Letters, 1966 (1) 129; Bulletin de la Societe Chimique de France, 1967 (3) 830 ]. Applicants have synthesized pure 8-nonene-2-one from 8-nonyn-2-one which was obtained via acetylene by the method revealed by M. Barbier et al. (Bulletin de la Societe Chimique de France, 1961 1324) and by partial hydrogenation of it by Lindlar catalyst. The total yield of pure said material was 34.8% and the physical properties were as follows:

| | | |
|---|---|---|
| Boiling Point | 92–93 | °C/25 Torr. |
| Specific Gravity | d₄²⁰ | 0.8434 |
| Refractive Index | n_D²⁰ | 1.4352 |
| Molecular Refraction | | Observed Value 43.403 as $C_9H_{16}OF_1$ Calculated Value 43.306 |
| Infrared Absorption | | 3080, 1715 cm⁻¹ (—C=O) 1635, 995, 910 cm⁻¹ (—CH=CH₂) |
| NMR CDCl₃ 60M_c | 1.2–1.7 | (4H, m, C—(CH₂)₂—C) |
| | 1.8–2.1 | (2H, C=C—CH₂—) |
| | 2.13 | (3H, S, CH₃C=O) |
| | 2.41 | (2H, t, J=7.5 cps, CH₂CO) |
| | ca. 4.98 | (2H, —C—C=CH₂) |
| | ca. 5.81 | (1H, —C—CH—C) |
| MS, m/e | 140 | M⁺ |
| | 43 | CH₃CO |
| | 97 | M⁺ −43 |
| | 58 | CH₃—CO—CH₂+H |
| | 82 | M⁺ −58 |
| | 41, 55, 69, 83 | Allylic cleavage |
| Semicarbazone M.P. | 117°C | |
| Anal. | | Found C 60.79, H 9.69% Calcd. C 60.88, H 9.71 |

However, no report or paper has been published yet on the flavor effect of 8-nonene-2-one. It has been found that said material not only gives a particularly strong Blue cheese-like flavor by itself alone, but also gives a flavor or flavors quite resembling those of natural cheese, butter, cream by jointly using already known flavor materials of fatty acids and fatty alcohols mentioned above. For example, when 8-nonene-2-one (with or without addition of a saturated methyl ketone) is added to the earlier cited compounded flavor materials for dairy products, the dairy products thereof have quite the same flavor as those of natural ones. If 8-nonene-2-One alone is added to natural dairy products, only about 1–100 ppm is sufficient and if it is added to earlier cited compounded flavor materials about 1–10% is sufficient. It is of course possible to add each flavor material to foodstuffs separately and independently during processing or at a proper stage of food production, but it is far better to prepare a mixture of flavor materials and add said mixture to foodstuffs at a proper stage of food production. It should be stressed that the use of saturated methyl ketones which are known to be present in the dairy products such as 2-pentanone, 2-heptanone, 2-nonanone and the like instead of 8-nonene-2-one gives far less effects.

The following examples are presented to further illustrate the invention and do not constitute express or implied limitations.

EXAMPLE 1

In a panel test of 8-nonene-2-one for its flavor which was examined in a panel consisting of 12 specialists, all of them replied that said compound had a flavor of Blue cheese. For a tasting test, process cheese which has scanty flavor was deodorized under a low temperature and high vacuum and to which 100 ppm of 8-nonene-2-one was added. Said treated cheese tasted quite like Blue cheese. Further, in a panel test of keeping a water solution containing 1 ppm of 8-nonene-2-one in the mouth, which was examined by 12 specialists, eight of them replied that it had a cheese-like flavor, four of them replied that it had a butter-like or cream-like flavor. The threshold value of 8-nonene-2-one being about 0.2 ppm, it was found that at an extremely low concentration it has a flavor of butter, cream and/or a flavor common to all kinds of cheese, except for that of Blue cheese. About the flavor of a water solution containing various concentrations of 8-nonene-2-one, 12 specialists of the aforementioned panel had the opinions as follows:

| Water solution containing 8-nonene-2-one of | | Flavour resembling to |
|---|---|---|
| 3–50 | ppm | Blue cheese |
| 1– 5 | " | cheese |
| 0.2–1 | " | butter, cream or fresh milk |

Two kinds of cis-isomers of 8-nonene-2-one each of which has a respective double bond at different position were synthesized. And 8-nonene-2-one, two kinds of cis-isomers were compared to determine which of the three has the flavor most resembling the flavors of dairy products by a pairred comparison by Scheffé's Analysis in which the first rank was given three marks, the second rank was given two marks and the third rank was given one mark. The result of said comparison was as follows:

| | cis-6-nonene-2-one | cis-7-nonene-2-one | 8-nonene-2-one |
|---|---|---|---|
| 1st rank | 0 mark(s) | 1 mark(s) | 11 mark(s) |
| 2nd rank | 1 " | 10 " | 1 " |
| 3rd rank | 11 " | 1 " | 0 " |
| Total | 13 " | 24 " | 35 " |

EXAMPLE 2

One part of 8-nonene-2-one was added to one or more kinds of fatty acids and its esters, alcohols, carbonyl compounds and/or lactones. 1 ppm of the respective mixture was added to water to get various kinds of water solutions and the water solutions were compared to determine the coeffect of 8-nonene-2-one. In the comparison test, 12 specialists were present to determine which of the compounds gives a flavor more akin to natural dairy products. The following are the data obtained by the comparison test.

| materials jointly used with 1 part of 8-nonene-2-one | part(s) | flavour | effect |
|---|---|---|---|
| 1. butyric acid | 2 | cheese-like | ++ |
| 2. caprylic acid | 0.1 | Blue cheese-like | ++ |
| 3. ethyl butyrate | 0.1 | increase floridness | + |
| 4. 2-hexanol | 0.1 | common to all dairy products | + |
| 5. 2-heptanone | 9 | cheese-like | +++ |
| 6. acetoin | 0.1 | common to all dairy products | + |
| 7. diacetyl | 0.1 | " | + |
| 8. delta-decalactone | 1 | butter-like | +++ |
| 9. delta-decalactone | 9 | fresh milk-like | +++ |
| 10. caproic acid<br>2-heptanone | 8<br>1 | cheese-like | +++ |
| 11. oleic acid<br>delta-decalactone | 2<br>1 | butter-like | +++ |
| 12. butyric acid<br>caproic acid<br>caprylic acid<br>2-heptanone<br>acetoin | 1<br>2<br>4<br>1<br>0.1 | cheese-like | +++ |
| 13. butyric acid<br>oleic acid<br>2-pentanone<br>2-heptanone<br>diacetyl<br>acetoin<br>delta-decalactone<br>delta-dodecalactone | 2<br>2<br>0.3<br>0.5<br>0.1<br>0.1<br>8<br>6 | butter-like | +++ |

+++ remarkably effective
++ considerably effective
+ effective to some extent

Example 3

| | A part(s) | B part(s) |
|---|---|---|
| butyric acid | 2 | |
| propionic acid | 1 | 1 |
| ethyl butyrate | 1 | 1 |
| ethyl oleate | 50 | 50 |
| butyl lactate | 50 | 50 |
| vanillin | 1 | 1 |
| delta-decalactone | 26 | 26 |
| delta-dodecalactone | 30 | 30 |
| acetoin | 1 | 1 |
| 8-nonene-2-one | 20 | — |
| 2-heptanone | — | 20 |
| octyl decyl triglyceride | 818 | 818 |
| Total | 1000 | 1000 |

Each fresh milk-like compounded flavor material A or B was prepared by mixing the ingredients together. 1% of each was added respectively to a compounded milk consisting of the following materials:

| | | |
|---|---|---|
| powdered skim milk | 19.6 | parts |
| vegetable oil | 3 | " |
| emulsifying agent and stabilizer | 0.4 | " |
| water | 87 | " |
| Total | 100.0 | " |

The compounded milk containing A and B were examined by 10 specialists to determine which of A or B had a flavor more akin to that of natural fresh milk. All of the specialists replied that A had a flavor more like that of natural fresh milk.

EXAMPLE 4

An ice cream mix consisting of

| | parts |
|---|---|
| refined soy bean protein | 50 |
| powdered skim milk | 60 |
| refined vegetable oil | 100 |
| sugar | 150 |
| glucose | 50 |
| emulsifying agent | 5 |
| stabilizer | 5 |
| extracts of natural vanilla | 5 |
| water | 575 |
| Total | 1000 | was prepared. To the mix was added 0.5% of flavor material consisting of

| | part(s) |
|---|---|
| 8-nonene-2-one | 1 |
| octyl decyl triglyceride | 9 |
| Total | 10 |

The resulting composition was processed to make ice cream by a conventional method and the ice cream thereof was named A. An ice cream not containing said flavor material was also prepared by a conventional method and was named B. A and B were examined by way of comparison by 10 specialists to determine which of the two was better. All of the specialists replied that A was better.

EXAMPLE 5

Compounds prepared in accordance with the following recipes A and B were obtained and A had a flavor quite resembling that of Blue cheese while B had a flavor quite resembling that of Cheddar cheese.

| | A part(s) | B part(s) |
|---|---|---|
| n-butyric acid | 15 | 20 |
| caproic acid | 20 | 40 |
| caprylic acid | 3 | 5 |
| capric acid | 4 | 5 |
| 2-heptanol | 1 | 5 |
| 2-pentanol | 1 | 5 |
| n-butanol | 1 | 2 |
| acetoin | 1 | 1 |
| diacetyl | 0.1 | 0.2 |
| ethyl butyrate | 0.2 | 0.3 |
| ethyl acetate | 0.1 | 0.2 |
| 8-nonene-2-one | 50 | 10 |
| refined vegetable oil | 903.6 | 906.3 |
| Total | 1000 | 1000 |

0.01% of A or B was added respectively to process cheese having scanty flavor and having been deodorized under a low temperature and high vacuum and thereafter the flavor of said cheese was examined by 10 specialists by way of comparison with natural Blue cheese or natural Cheddar cheese. The results of comparison were as follows:

| | A | B |
|---|---|---|
| Number of specialists who replied that there was quite a resemblance between the Process cheese and natural Blue cheese or natural Cheddar cheese | 10 | 9 |
| Number of specialists who replied that there was some resemblance between the Process cheese and natural Blue cheese or natural Cheddar cheese | 0 | 1 |
| Number of specialists who replied that there was no resemblance between the Process cheese and natural Blue cheese or natural Cheddar cheese | 0 | 0 |

Further, compounds prepared were in accordance with the aforementioned recipes A and B wherein several kinds of saturated methyl ketones of the following materials instead of 8-nonene-2-one were used and such recipes were named A' and B'.

| | A' parts | B' parts |
|---|---|---|
| 2-pentanone | 10 | 2 |
| 2-heptanone | 30 | 6 |
| 2-nonanone | 10 | 2 |
| Total | 50 | 10 |

A and A', B and B' were examined by 10 specialists for the comparisons of flavors with those of natural Blue cheese or Cheddar cheese. In the comparison test, all of the 10 specialists replied that A or B had a flavor more resembling those of natural products than A' or B' had. Further, cheese crackers consisting of the following materials and containing 0.01% of A, A', B and B' were respectively prepared by a conventional method.

| | part(s) |
|---|---|
| wheat flour | 100 |
| shortening | 16 |
| table salt | 1.8 |
| sodium bicarbonate | 0.9 |
| yeast | 3 |
| flavour materials | 0.001 |
| water | 30.0 |

For the comparison, cheese crackers to which natural Blue cheese or natural Cheddar cheese were respectively added were also prepared. In a comparison test of cheese crackers examined by 10 specialists, all of them replied that A or B had a flavor more resembling those of natural products than A' or B' had.

EXAMPLE 6

A composition prepared in accordance with the following recipe C was obtained and C had a flavor quite resembling that of natural fresh butter or cream.

| | C part(s) |
|---|---|
| n-butyric acid | 50 |
| caproic acid | 5 |
| 2-pentanol | 3 |
| 2-heptanol | 3 |
| n-butanol | 1 |
| delta-decalactone | 35 |
| delta-dodecalactone | 6 |
| acetoin | 2 |
| diacetyl | 1 |
| ethyl butyrate | 0.1 |
| ethyl lactate | 0.1 |
| ethyl acetate | 0.1 |
| cis-3-hexenol | 1 |
| 8-nonen-2-one | 10 |
| refined vegetable oil | 882.7 |
| Total | 1000 |

0.01% of C was added to artificial butter having no flavor and thereafter the flavor of said artificial butter was examined by 10 specialists by way of comparison with natural fresh butter. All of the specialists replied that it quite resembled that of natural fresh butter.

Further, a composition prepared in accordance with the said recipe C wherein the following materials instead of 10 parts by wt. of 8-nonene-2-one were used and such recipe was named C'.

| | part(s) |
|---|---|
| butanone | 1 |
| 2-pentanone | 2 |
| 2-heptanone | 5 |
| 2-nonanone | 2 |
| Total | 10 |

0.01% of C or C' was added respectively to imitation cream having no flavor and thereafter the flavor of said imitation cream was examined by 10 specialists by was of comparison with natural cream. All of the specialists replied that C had a flavor more resembling that of natural cream than C' had.

What is claimed is:

1. A composition comprising a dairy product and a ketone containing flavoring material wherein the sole ketone is 8-nonene-2-one and wherein said ketone comprises from 0.2 to about 100 parts per million of said composition.

2. A composition of claim 1 wherein the dairy product is selected from the group consisting of natural butter, natural cheese, natural cream and natural milk.

3. A composition of claim 1 wherein the 8-nonene-2-one is present in an amount of from about 1 to about 100 ppm of the dairy product.

4. A composition comprising a food and a ketone-containing flavoring material wherein the sole ketone is 8-nonene-2-one and wherein said ketone comprises from 0.2 to about 100 parts per million of said composition, said food being selected from the group consisting of artificial butter, artificial cheese, artificial cream and artificial milk.

5. A method for imparting to a foodstuff a dairy product flavor, which comprises incorporating in said foodstuff from about 0.2 to about 100 parts per million of a flavoring material consisting of 8-nonene-2-one.

6. A method for imparting to a foodstuff a dairy product flavor, which comprises incorporating in said foodstuff a compounded flavor material consisting of 8-nonene-2-one and a component selected from the group consisting of a saturated straight chain fatty acid having an even number of carbon atoms of from 4 to 18, an unsaturated straight chain fatty acid having an even number of carbon atoms of from 4 to 18, a lower alkyl ester of one of said acids, an aliphatic aldehyde having from 2 to 12 carbon atoms, a secondary aliphatic alcohol having from 3 to 9 carbon atoms, acetoin, and mixtures thereof, said 8-nonene-2-one constituting from about 1 to about 10 percent of said compounded flavor material and from about 0.2 to about 100 parts per million of said foodstuff.

7. A composition of claim 4 containing a component selected from the group consisting of a saturated straight chain fatty acid having an even number of carbon atoms of from 4 to 18, an unsaturated straight chain fatty acid having an even number of carbon atoms of from 4 to 18, a lower alkyl ester of one of said acids, an aliphatic aldehyde having from 2 to 12 carbon atoms, a secondary aliphatic alcohol having from 3 to 9 carbon atoms, acetoin, and mixtures thereof, wherein said 8-nonene-2-one constitutes from about 1 to about 10 percent of the sum of said 8-nonene-2-one and said component.

8. A method of claim 5 wherein said foodstuff is selected from the group consisting of natural butter, natural cheese, natural cream and natural milk.

9. A method of claim 5 wherein said foodstuff is selected from the group consisting of artificial butter, artificial cheese, artificial cream, and artificial milk.

10. A method of claim 5 wherein said foodstuff is made of or made from a dairy product.

11. A method of claim 6 wherein said foodstuff is selected from the group consisting of natural butter, natural cheese, natural cream and natural milk.

12. A method of claim 6 wherein said foodstuff is selected from the group consisting of artificial cheese, artificial butter, artificial cream and artificial milk.

13. A method of claim 6 wherein said foodstuff is made of or made from a dairy product.

14. A compounded flavor material consisting of from about 1 to about 10 percent of 8-nonene-2-one and the balance a triglyceride.

* * * * *

UNITED STATES PATENT AND TRADEMARK OFFICE
CERTIFICATE OF CORRECTION

PATENT NO. : 3,904,780
DATED : September 9, 1975
INVENTOR(S) : RYO YAMAMOTO et al It is certified that error appears in the above—identified patent and that said Letters Patent are hereby corrected as shown below:

The Title should be deleted and replaced by ---METHOD FOR IMPARTING A DAIRY PRODUCT FLAVOR TO A FOODSTUFF---.

The Abstract should be deleted and replaced by ---This invention relates to a method for imparting a dairy product flavor to a foodstuff or increasing a dairy product flavor of a foodstuff, by incorporating in the foodstuff 8-nonene-2-one.---.

Column 3, line 9 - "One" should be ---one---.

Column 4, Example 3 - Under Column "B", ---2--- should be inserted for "butyric acid".

Column 5, line 49 - "Compounds" should be ---Compositions---.

Column 6, line 22 - "compounds" should be ---compositions---.

Column 7, line 38 - "was" should be ---way---.

Signed and Sealed this

Fifth Day of October 1976

[SEAL]

Attest:

RUTH C. MASON
Attesting Officer

C. MARSHALL DANN
Commissioner of Patents and Trademarks